US006757887B1

(12) United States Patent
Kaplan et al.

(10) Patent No.: US 6,757,887 B1
(45) Date of Patent: Jun. 29, 2004

(54) METHOD FOR GENERATING A SOFTWARE MODULE FROM MULTIPLE SOFTWARE MODULES BASED ON EXTRACTION AND COMPOSITION

(75) Inventors: Matthew Kaplan, New York, NY (US); Vincent Joseph Kruskal, Harrison, NY (US); Harold Leon Ossher, South Salem, NY (US); Peri Lynn Tarr, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,751

(22) Filed: Apr. 14, 2000

(51) Int. Cl.[7] .................................................. G06F 9/44
(52) U.S. Cl. ...................... 717/106; 717/144; 717/133; 717/114; 714/38
(58) Field of Search ................................ 717/131–193, 717/159, 704–109, 162, 165, 114; 707/104, 103; 345/762, 763; 714/38, 37

(56) References Cited

U.S. PATENT DOCUMENTS

| | | | | |
|---|---|---|---|---|
| 5,123,103 A | * | 6/1992 | Ohtaki et al. | 707/5 |
| 5,675,788 A | * | 10/1997 | Husick et al. | 707/104 |
| 6,185,578 B1 | * | 2/2001 | Yokote et al. | 707/203 |
| 6,609,250 B1 | * | 8/2003 | Kasai et al. | 717/178 |

OTHER PUBLICATIONS

David L. Parnas, "On the Criteria To Be Used in Decomposing Systems into Modules", Communications of the ACM, vol. 15, No. 12, pp. 1053–1058, Dec. 1972.

Fuggetta et al., "Feature Engineering", Proceedings of the 9th International Workshop on Software Specification and Design, pp. 162–164, Apr. 1998.

Irwin et al., "Aspect–Oriented Programming", Proceedings of the European Conference on Object–Oriented Programming (ECOOP), Finland, Springer–Verlag, LNCS 1241, pp. 220–242, Jun. 1997.

Finkelstein et al., "A Framework for Expressing the Relationships Between Multiple Views in Requirements Specifications", IEEE Transactions on Software Engineering, vol. 20, No. 10, pp. 760–773, Oct. 1994.

Harrison et al., "N Degrees of Separation: Multi–Dimensional Separation of Concerns", Proceedings of the 21st International Conference on Software Engineering, pp. 107–119, May 1999.

(List continued on next page.)

*Primary Examiner*—Tuan Dam
*Assistant Examiner*—Chuck Kendall
(74) *Attorney, Agent, or Firm*—F. Chau & Associates, LLC

(57) ABSTRACT

There is provided a method for generating a software module based upon elements from multiple software modules. The method includes the step of extracting a plurality of sets of elements from the multiple software modules based upon at least one extraction criterion. Any elements in the sets that violate at least one correctness and completeness criterion are identified. The violating elements are automatically brought into compliance with the at least one correctness and completeness criterion. A plurality of single software modules is generated, wherein each of the single software modules contains one of the sets of elements. The plurality of single software modules are composed to form a final, single software module. The extracting step may include the steps of: classifying the elements in the multiple software modules according to concerns the elements pertain to; representing the concerns by a multi-dimensional space, wherein each dimension represents a type of concern, each coordinate on a dimension represents a concern of that type, and each point in the space represents an element; and representing the at least one extraction criterion in terms of the multi-dimensional space.

25 Claims, 5 Drawing Sheets

OTHER PUBLICATIONS

Griswold et al., "Automated Assistance for Program Restructuring", ACM Transactions on Software Engineering and Methodology, vol. 2, No. 8, pp. 228–269, Jul. 1993.

W.G. Griswold, "Program Restructuring as an Aid to Software Maintenance", Ph.D. Thesis, Technical Report 91–08–04, Department of Computer Science and Engineering, University of Washington, Jul. 1991.

M. Weiser, "Program Slicing", IEEE Transactions on Software Engineering, SE–10(4): 352–357, Jul. 1984.

Laffra et al., "Practical Experience with an Application Extractor for JAVA", Proceedings of the Fourteenth Annual Conference on Object–Oriented Programming System, Languages, and Applications (OOPSLA '99), Denver, CO, pp. 292–305, Nov. 1999.

Harrison et al., "Subjected–Oriented Programming (a critique of pure objects)", Proceedings of the Conference on Object–Oriented Programming: Systems, Languages, and Applications, ACM, pp. 411–428, Sep. 1993.

Harrison et al., Specifying Subject–Oriented Composition, Theory and Practice of Object Systems, 2(3):179–202, Dec. 1996.

Ossher et al., Multi–Dimensional Separation of Concerns and The Hyperspace Approach, M. Aksit (Ed.), pp. 1–31, Proceedings of the Symposium on Software Architecture and Component Technology, Kluwer, 2000.

Ossher et al., "Hyper/J™ User and Installation Manual", http://www.research.ibm.com/hyperspace, 2000.

Andersen et al., "System Design by Composing Structures of Interacting Objects", Proceedings of the European Conference on Object–Oriented Programming (ECOOP), pp. 133–152, Jun./Jul. 1992.

* cited by examiner

METHOD FOR GENERATING A SOFTWARE MODULE FROM MULTIPLE SOFTWARE MODULES BASED ON EXTRACTION AND COMPOSITION

BACKGROUND

1. Technical Field

The present invention relates generally to computer processing systems and, in particular, to a method for generating a software module from multiple software modules based on extraction and composition.

2. Background Description

Separation of concerns is at the core of software engineering. In its most general form, separation of concerns refers to the ability to identify, encapsulate, and manipulate only those parts of software that are relevant to a particular concept, goal, or purpose. Concerns are the primary motivation for organizing and decomposing software into manageable and comprehensible parts. Separation of concerns is further described by David L. Parnas, in "On the Criteria To Be Used in Decomposing Systems into Modules", Communications of the ACM, Vol. 15, No. 12, December 1972.

Many different kinds, or dimensions, of concerns may be relevant to different developers in different roles, or at different stages of the software lifecycle. For example, the prevalent kind of concern in object-oriented programming is data or class; each concern in this dimension is a data type defined and encapsulated by a class. Features, like printing, persistence, and display capabilities, are also common concerns, as are aspects, like concurrency control and distribution, roles, viewpoints, variants, and configurations. Separation of concerns involves decomposition of software according to one or more dimensions of concern. Features, aspects, roles, viewpoints are respectively described by: Fuggetta et al., in "Feature Engineering", Proceedings of the 9th International Workshop on Software Specification and Design, pp. 162–64, April 1998; Irwin et al., in "Aspect-Oriented Programming", Proceedings of the European Conference on Object-Oriented Programming (ECOOP), Finland, Springer-Verlag, LNCS 1241, June 1997; Andersen et al., in "System Design by Composing Structures of Interacting Objects", Proceedings of the European Conference on Object-Oriented Programming (ECOOP), June/July 1992; and Finkelstein et al., in "A Framework for Expressing the Relationships Between Multiple Views in Requirements Specifications", Transactions on Software Engineering, Vol. 20, No. 10, pp. 260–773, Oct. 1994

Separation of concerns has been hypothesized to reduce software complexity and improve comprehensibility; promote traceability within and across artifacts and throughout the lifecycle; limit the impact of change, facilitating evolution and non-invasive adaptation and customization; facilitate reuse; and simplify component integration.

These goals, while laudable and important, have not yet been achieved in practice. This is because the set of relevant concerns varies over time and is context-sensitive. Different development activities, stages of the software lifecycle, developers, and roles often involve concerns of dramatically different kinds. One concern may promote some goals and activities, while impeding others. Thus, any criterion for decomposition will be appropriate for some contexts, but not for all. Further, multiple kinds of concerns may be simultaneously relevant, and they may overlap and interact, as features and classes do. Therefore, different concerns and modularizations are needed for different purposes. The different purposes may differently implicate class, feature, viewpoint, aspect, role, variant, or other criterion.

These considerations imply the need for "multi-dimensional separation of concerns". Developers must be able to identify, encapsulate, modularize, and manipulate multiple dimensions of concern simultaneously, and to introduce new concerns and dimensions at any point during the software lifecycle, without suffering the effects of invasive modification and rearchitecture. However, even modern languages and methodologies suffer from a problem that has been referred to as the "tyranny of the dominant decomposition". That is, the languages and methodologies permit the separation and encapsulation of only one kind of concern at a time. A body of software can generally be decomposed in only one way, just as a typical document is divided into sections and subsections in only one way. This one decomposition is dominant, and often excludes any other form of decomposition. The "tyranny of the dominant decomposition" is further described by Harrison et al., in "N Degrees of Separation: Multi-Dimensional Separation of Concerns", Proceedings of the 21st International Conference on Software Engineering, pp. 107–19, May 1999.

Examples of tyrant decompositions are classes (in object-oriented languages), functions (in functional languages), and rules (in rule-based systems). Therefore, it is impossible to encapsulate and manipulate, for example, features in the object-oriented paradigm, or objects in rule-based systems. Accordingly, it is impossible to obtain the benefits of different decomposition dimensions throughout the software lifecycle. Developers of an artifact are forced to commit to one (or only a few at most), dominant dimension(s) early in the development of that artifact, and changing their choice can often have catastrophic consequences for the existing artifact. Further, since artifact languages often constrain the choice of dominant dimension (e.g., it must be class in object-oriented software), different artifacts (e.g., requirements and design documents) might be forced to use different decompositions, thus obscuring the relationships between them.

A particular decomposition of a body of software is a set of "modules" into which the software is divided. Modules can be nested within one another, and can be related in other ways. The intent is that each module encapsulate some particular concern. That is, all the software, and only the software, that pertains to that concern is contained within the module. Systems are built by selecting and composing modules. For example, modules in the JAVA programming language (henceforth referred to as "JAVA") are packages, classes and interfaces. Classes and interfaces enforce "data abstraction". Each is concerned with a particular data structure, and encapsulates all internal details of that data structure. All code is written within classes and interfaces, which in turn are grouped into packages. A system is built by selecting the packages, classes and interfaces to include.

Choice of decomposition, which implies choice of modules, is important because it determines which concerns are encapsulated within modules. These concerns can be more easily understood, because all the software pertaining to them is localized in the module. Moreover, these concerns can be modified with reduced impact, because changes are usually localized within the module. Further, these concerns can be used as the basis for system configuration. That is, these concerns can be selected for inclusion in, or exclusion from, systems. For example, in a standard JAVA system, packages, classes and interfaces can be included or excluded. In a system decomposed by feature, features can be included or excluded. However, since typical features involve portions of multiple classes, features cannot be used as the basis for configuration in standard JAVA, and classes could not be used as the basis for configuration in a feature-based decomposition. Lastly, these concerns can be used as a unit of reuse. However, concerns that are not encapsulated within modules typically cut across many modules. Such concerns are not localized and, therefore, do not enjoy the above described benefits.

The tyranny of the dominant decomposition forces a single decomposition on a body of software, thereby conferring benefits on a particular kind of concern at the expense of other concerns. Currently, it is believed that the tyranny of the-dominant decomposition is the single most significant cause of the failure to achieve many of the expected benefits of separation of concerns.

3. Problems with the State of the Art

A brief description will now be given of the prior art that is concerned with function extraction. In some restructuring tools, the user is allowed to select some contiguous code and request that the code be extracted and made into a function. A call to this function is substituted at the original location. The function extraction method performs an analysis to find any variables that are referred to, but are not declared, within the selected code or globally (i.e., free variables), and creates parameter declarations for these variables. However, as noted above, this approach suffers the disadvantage of requiring that the selected code be a contiguous chunk coming from a single module. Thus, the approach does not address the problem of modularizing code that is scattered across modules. Restructuring tools are further described by Griswold et al., in "Automated Assistance for Program Restructuring", Transactions on Software Engineering Methodology", ACM, July 1993; and W. G. Griswold, in "Program Restructuring as an Aid to Software Maintenance", Ph.D. Thesis, Technical Report 91-08-04, Department of Computer Science and Engineering, University of Washington, July 1991.

A brief description will now be given of the prior art that is concerned with program slicing. Tools have been built that allow the user to select some variables and some location within a program. The slicing method determines all statements that contribute to the value of those variables at that location. Slicing typically involves a single module as input. However, inter-procedural slicing involves multiple input modules. The result of slicing is typically identification of the relevant statements, but not extraction into a semantically correct module that can later be composed with other modules. Thus, composition of such slices is an unsolved problem. Program slicing is further described by M. Weiser, in "Program Slicing", IEEE Transactions on Software Engineering, SE-10(4): 352–357, July 1984.

A brief description will now be given of the prior art that is concerned with compaction. The user selects some program elements (e.g., all code written by the user, but not library functions). The compaction method also extracts all other code, including library code, upon which the selected code depends, but not extraneous code (or, at the least, it reduces the amount of extraneous code that remains in the program). The result is a complete program whose executions are the same as those of the original program. Compaction cannot isolate concerns in the required manner, because typically the concerns to be separated are interrelated. Compaction is designed to bring in all related software to produce a complete, runnable program, so it will not accomplish separation to any extent. Compaction is further described by Laffra et al., in "Practical Experience with an Application Extractor for JAVA", Proceedings of the Fourteenth Annual Conference on Object-Oriented Programming System, Languages, and Applications (OOPSLA '99), Denver, Col, pp. 292–305, Nov. 1999.

A brief description will now be given of the prior art that is concerned with linking. Separate functions, classes or similar modules can be "composed" by linking them together with standard program linkers. This is the oldest and most widespread composition technology. However, linking does not involve extracting new modules from existing software.

There are various modern approaches to separation of concerns, such as, for example, subject-oriented programming and aspect-oriented programming, that allow "cross-cutting modules" to be written that collect relevant portions of software that would normally be scattered across many programming language modules. These permit, for example, the various members of various classes that together implement a feature to be coded into a single feature module. Composition (sometimes referred to as "weaving") is used to combine these cross-cutting modules into regular programming language modules, which can then be executed. However, these approaches require the software to be decomposed "when originally written" into the desired cross-cutting modules. The approaches do not support on-demand remodularization. That is, the approaches do not support the ability to extract new modules from existing software to support a new decomposition, without editing the existing software. Subject-oriented programming and aspect-oriented programming are respectively described by: Harrison et al., in "Subject-Oriented Programming (a critique of pure objects)", Proceedings of the Conference on Object-Oriented Programming: Systems, Languages, and Applications, ACM, pp. 411–28, Sept. 1993; and Irwin et al., in "Aspect-Oriented Programming", Proceedings of the European Conference on Object-Oriented Programming (ECOOP), Finland, Springer-Verlag, LNCS 1241, June 1997.

Thus, there is a need for a method for generating a software module from multiple software modules which overcomes the above problems of the prior art.

SUMMARY OF THE INVENTION

The present invention is directed to a method for generating a software module from multiple software modules based on extraction and composition. The invention allows for "on-demand remodularization". That is, the invention allows a body of software that was written with one (or more) particular decompositions to be decomposed in different ways, without rewriting the software and, in some cases, without even recompiling the software. Modules making up these new decompositions can then be used for composing systems. This approach can be applied to any software development paradigms and languages.

According to a first aspect of the invention, there is provided a method for generating a software module based upon elements from multiple software modules. The method includes the step of extracting a set of elements from the multiple software modules based upon at least one extraction criterion. Any elements in the set that violate at least one correctness and completeness criterion are identified. The violating elements are automatically brought into compliance with the correctness and completeness criterion. A single software module is generated that contains the set of elements.

According to a second aspect of the invention, the step of bringing the violating elements into compliance includes at least one of the steps of: adding at least one element to the set of elements; modifying at least one of the violating elements; and modifying at least one of the non-violating elements.

According to a third aspect of the invention, the extraction criterion is one of predefined and specified by a user.

According to a fourth aspect of the invention, the correctness and completeness. criterion is one of predefined and specified by a user.

According to a fifth aspect of the invention, the correctness and completeness criterion corresponds to a declarative correctness and completeness criterion.

According to a sixth aspect of the invention, the declarative correctness and completeness criterion includes a specification that a given element referenced in the set must also be declared in the set in a manner that is compatible with all uses of the given element.

According to a seventh aspect of the invention, the extraction criterion identifies first elements that are to be extracted, and second elements that are not to be extracted in the event that such second elements are part of said first elements.

According to an eighth aspect of the invention, each of the software modules includes software code or software design artifacts.

According to a ninth aspect of the invention, the extracting step further includes the steps of: classifying the elements in the multiple software modules according to concerns the elements pertain to; representing the concerns by a multi-dimensional space, wherein each dimension represents a type of concern, each coordinate on a dimension represents a concern of that type, and each point in the space represents an element; and representing the extraction criterion in terms of the multi-dimensional space.

According to a tenth aspect of the invention, there is provided a method for generating a software module based upon elements from multiple software modules. The method includes the step of extracting a plurality of sets of elements from the multiple software modules based upon at least one extraction criterion. Any elements in the sets that violate at least one correctness and completeness criterion are identified. The violating elements are automatically brought into compliance with the correctness and completeness criterion. A plurality of single software modules is generated, wherein each of the single software modules contains one of the sets of elements. The plurality of single software modules are composed to form a final, single software module.

According to an eleventh aspect of the invention, the composing step includes the step of composing the plurality of single software modules with one another, with other software modules, or any combination thereof.

According to a twelfth aspect of the invention, the composing step includes the step of determining correspondence between the elements in the plurality of single software modules.

According to a thirteenth aspect of the invention, the composing step further includes the step of combining corresponding elements into the final, single software module.

According to a fourteenth aspect of the invention, there is provided a method for generating a software module based upon elements from multiple software modules. The method includes the step of providing multiple software modules. A set of elements is extracted from the multiple software modules based upon at least one criterion. The set is analyzed to find any elements that are referenced within the set but are not declared within the set. Declarations of the undeclared elements are automatically added to the set, so that the set is declaratively complete. A single software module is generated that contains the set of elements.

According to a fifteenth aspect of the invention, there is provided a method for generating a software module based upon elements from multiple software modules. The method includes the step of extracting a plurality of sets of elements from the multiple software modules based upon at least one criterion. Any elements in the sets that are referenced, but not declared, in the sets are identified. Declarations of the identified elements are automatically added to the respective sets, so that the sets are declaratively complete. A plurality of single software modules are generated, wherein each of the single software modules contains one of the resulting sets of elements. The plurality of single software modules are composed to form a final, single software module, wherein the final, single software module is a semantically correct entity.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method for generating a software module from multiple software modules based on extraction and composition. It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Furthermore, for purposes of illustration, the present invention will be described herein in relation to JAVA, which is a well-known object-oriented programming language. It is to be understood, however, that the present invention is equally applicable to other object-oriented programming languages, as well as non-object-oriented programming languages, and notations used for software development that are not programming languages (e.g., formalisms for requirements specification, and design notations and diagrams). Given the teachings of the present invention provided herein, one of ordinary skill in the related art will be able to contemplate these and similar implementations or configurations of the present invention.

Figure 1:
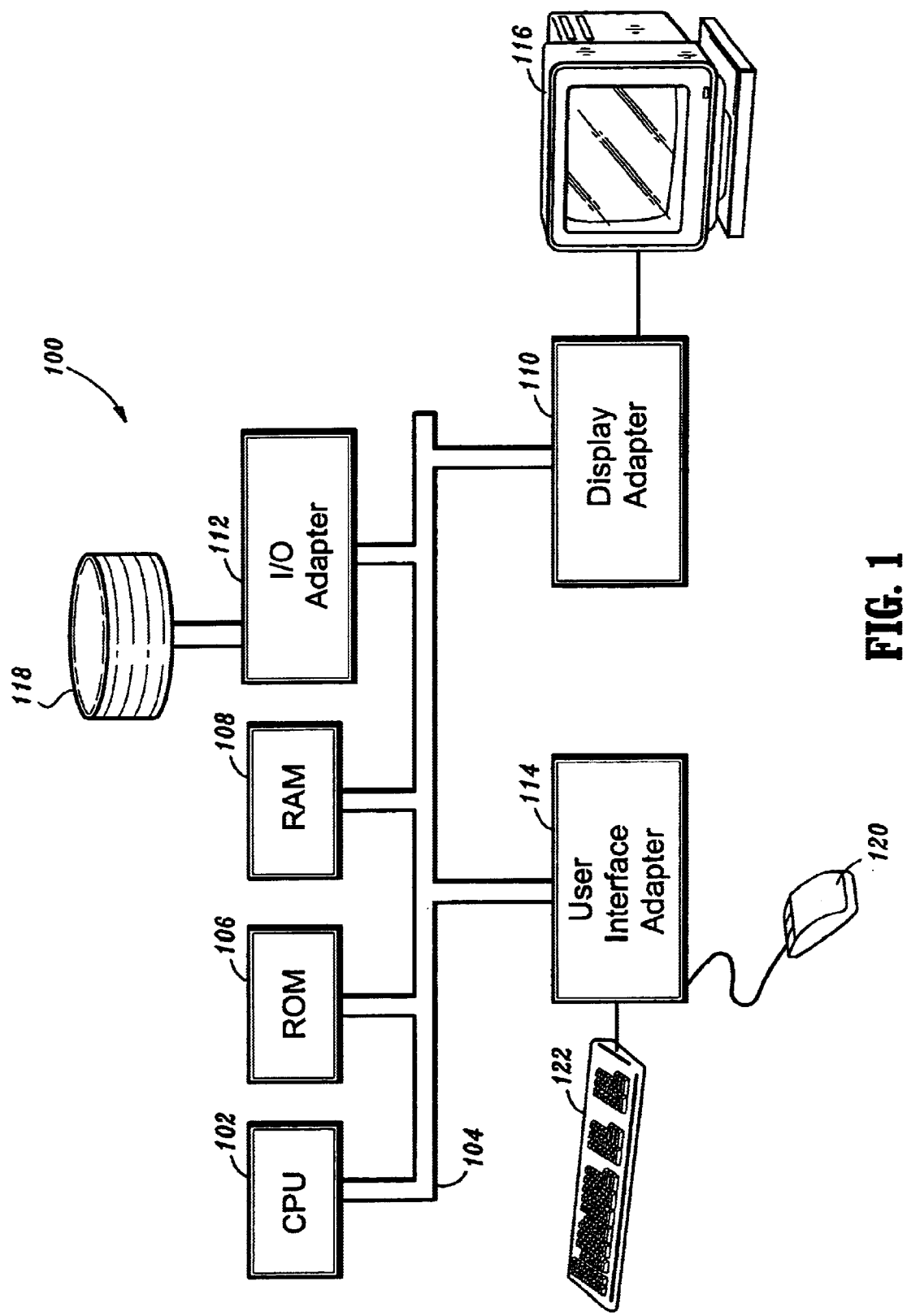
FIG. 1 is a block diagram of a computer processing system to which the present invention may be applied according to an embodiment thereof.

FIG. 1 is a block diagram of a computer processing system 100 to which the present invention may be applied according to an embodiment thereof. The computer processing system includes at least one processor (CPU) 102 operatively coupled to other components via a system bus 104. A read-only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100. It is to be appreciated that other configurations of computer processing system 100 may be employed in accordance with the present invention while maintaining the spirit and the scope thereof.

Figure 2:
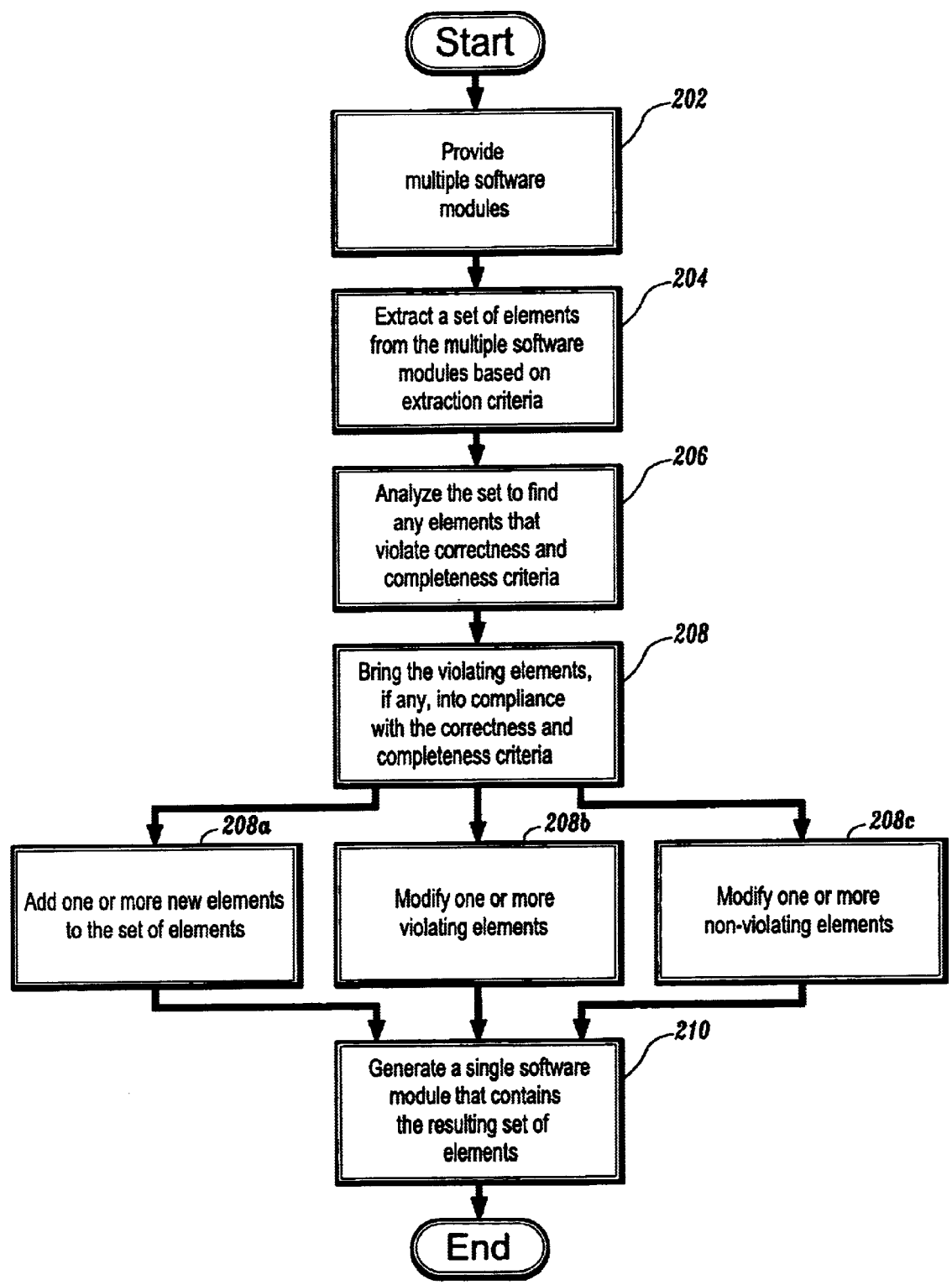
FIG. 2 is a flow diagram of a method for generating a software module based upon elements from multiple software modules according to an illustrative embodiment of the present invention.

A general description of the present invention will now be provided with respect to FIG. 2 to introduce the reader to the concepts of the invention. Subsequently, more detailed descriptions of various aspects of the invention will be provided.

FIG. 2 is a flow diagram of a method 200 for generating a software module based upon elements from multiple software modules according to an illustrative embodiment of the present invention. The method includes the step of providing multiple software modules (step 202). A set of elements is extracted from the multiple software modules based upon at least one extraction criterion (step 204). The set of elements is analyzed to find any elements that violate at least one correctness and completeness criterion (step 206). The violating elements, if any, are automatically brought into compliance with the correctness and completeness criterion (step 208). Some of the ways in which violating elements can be brought into compliance are shown in steps 208a–c, which are further described hereinbelow. A single software module is then generated that contains the resulting set of elements (step 210).

It is to be appreciated that the extraction criterion and the correctness and completeness criterion may be predefined or specified by a user (e.g., in real-time). Moreover, the extraction criterion and the correctness and completeness criterion may include many different types of criteria. However, to facilitate a clear understanding of the present invention, embodiments of the present invention will now be described wherein the correctness and completeness criterion corresponds to declarative completeness, as described hereinbelow. Nonetheless, given the teachings of the present invention provided herein, one of ordinary skill in the related art will contemplate these and many other criteria which maintain the spirit and scope of the present invention. For example, the following types of criteria may be used with respect to correctness and completeness:

(1) No restrictions at all, any set is acceptable.

(2) Every use of an identifier is declared, with no type information (Oust the existence of a declaration is enough).

(3) Every use of an identifier is declared, with type information, and the type information must be consistent with every use. This is the declarative completeness employed hereinbelow.

(4) Every use of an identifier is declared, with semantic specifications, such as pre- and post-conditions for every operation and invariants for every variable. The uses must satisfy the semantic specifications.

(5) Elements have semantic specifications, such as pre- and post-conditions for every operation and invariants for every variable, or just informal specifications written in natural language. The specifications of all the selected elements must be non-contradictory, and together must imply some desired condition (e.g., that the selected set performs some specific task or has some specific effect).

With respect to bringing the violating elements into compliance with the correctness and completeness criterion as per step 208, this may include adding one or more new elements to the set of elements 208a, modifying one or more violating elements 208b, and/or modifying one or more non-violating elements 208c. Given the teachings of the present invention provided herein, one of ordinary skill in the related art will contemplate these and various other ways in which all the elements in a set of elements may be made to comply with applicable correctness and completeness criteria.

Figure 3:
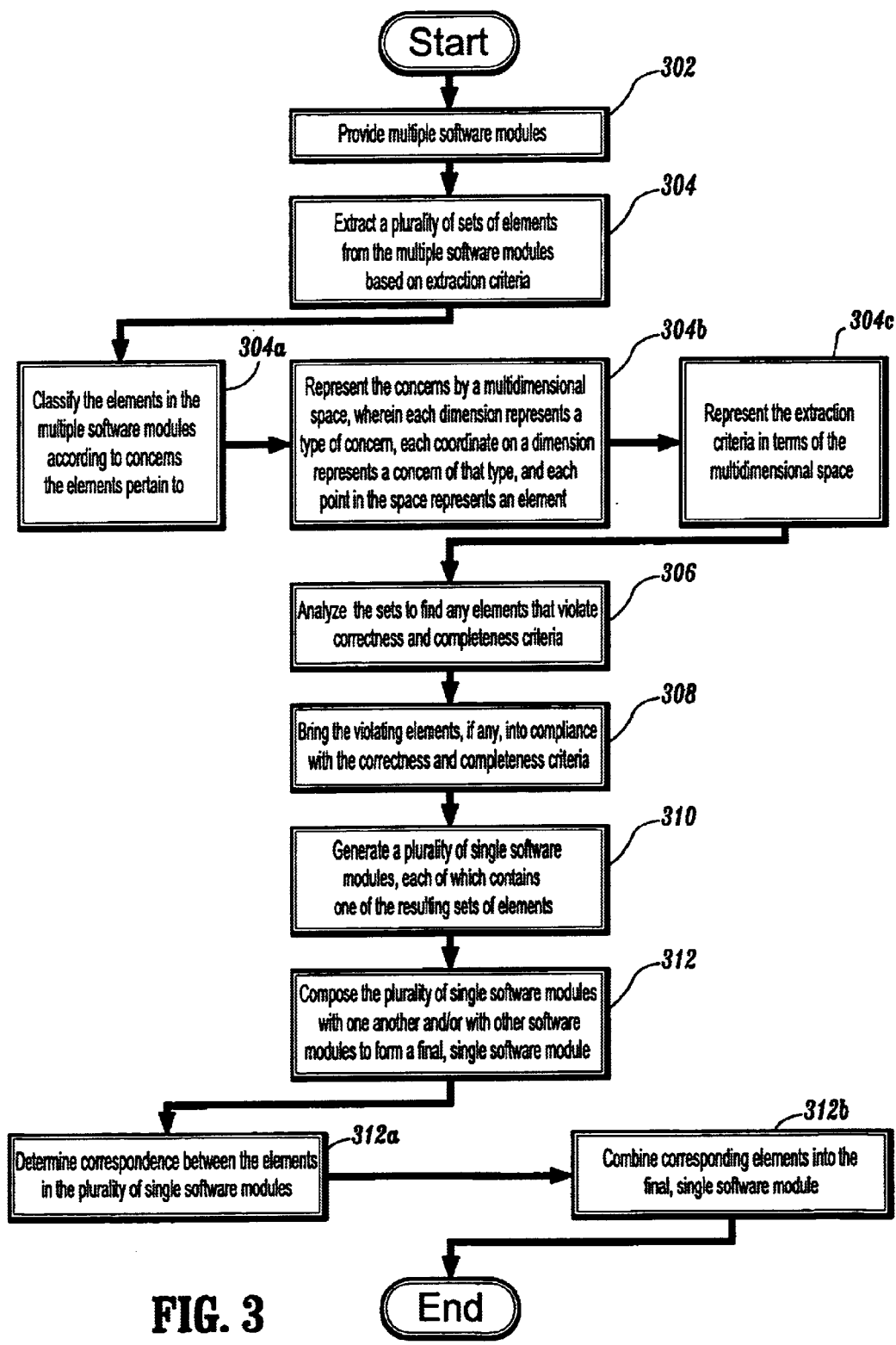
FIG. 3 is a flow diagram of a method for generating a software module based upon elements from multiple software modules according to another illustrative embodiment of the present invention.

FIG. 3 is a flow diagram of a method 300 for generating a software module based upon elements from multiple software modules according to another illustrative embodiment of the present invention. The method includes the step of providing the multiple software modules (step 302).

A plurality of sets of elements are extracted from the multiple software modules based upon at least one extraction criterion (step 304). In a preferred embodiment of the present invention, the extraction step (304) includes the following steps: classifying the elements in the multiple software modules according to concerns the elements pertain to (step 304a); representing the concerns by a multi-dimensional space, wherein each dimension represents a type of concern, each coordinate on a dimension represents a concern of that type, and each point in the space represents an element (step 304b); and representing the criterion in terms of the multi-dimensional space (step 304c).

Any elements in the sets that violate at least one correctness and completeness criterion are identified (step 306). The violating elements are automatically brought into compliance with the correctness and completeness criterion (step 308).

A plurality of single software modules is generated, wherein each of the single software modules contains one of the sets of elements (step 310). The plurality of single software modules are composed to form a final, single software module (step 312). The plurality of single software modules may be composed with one another and/or with other software modules. The composing step may include the steps of: determining correspondence between the elements in the plurality of single software modules (step 312a); and combining corresponding elements into the final, single software module (step 312b).

Figure 4:
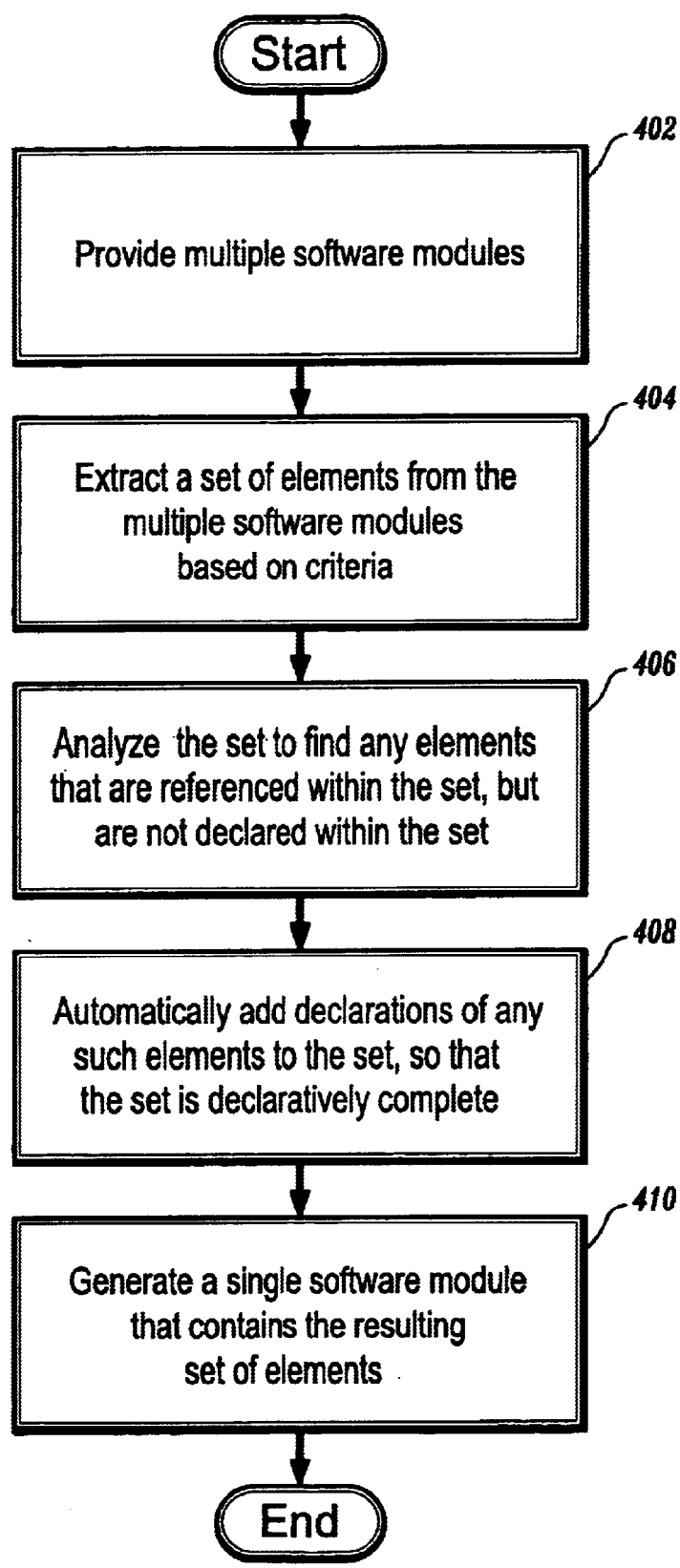
FIG. 4 is a flow diagram of a method for generating a software module based upon elements from multiple software modules according to yet another illustrative embodiment of the present invention.

FIG. 4 is a flow diagram of a method 400 for generating a software module based upon elements from multiple software modules according to yet another illustrative embodiment of the present invention. The method includes the step of providing multiple software modules (step 402). A set of elements is extracted from the multiple software modules based upon at least one criterion (step 404). The set of elements is analyzed to find any elements that are referenced within the set but are not declared within the set (step 406). Declarations of any such elements are automatically added to the set, so that the set is declaratively complete (as further described hereinbelow) (step 408). A single software module is then generated that contains the resulting set of elements (step 410).

The method of FIG. 4 will now be further described in greater detail according to various illustrative embodiments of the present invention.

With respect to step 402, the input to the method is a body of software consisting of multiple software modules. The software can be material from any and all stages of the software life cycle, including but not limited to requirement specifications, design documents, code, and test plans. The software can be written in any notation, or in mixtures of notations. Each module comprises other modules and/or a collection of pieces of software, called "elements". For the purposes of the present invention, elements are treated as indivisible. When applying the method to software written in a particular notation, a decision must be made as to which pieces of software are considered elements.

In a preferred embodiment of the present invention, the method is applied to code written in JAVA. Thus, modules are packages, classes and interfaces. Elements are member functions and member variables. Therefore, in the preferred embodiment, member functions are treated as indivisible, and no attempt is made to separate code within method bodies.

It is to be appreciated that while a preferred embodiment of the invention is described such that code with method bodies is not separated, the invention is not so limited. Thus, in alternate embodiments, code within method bodies may be separated.

With respect to step 404 of FIG. 4, from the set of all the elements in the body of software, a subset of all elements that satisfy at least one criterion is extracted. Examples of criteria that may be employed in step 404 include, for example, elements with a particular name, or elements whose names match a particular pattern. However, in general, criteria need not be related to element name. Relevant criteria are further described hereinbelow.

With respect to step 406 of FIG. 4, the extracted set of elements is analyzed to determine whether they satisfy at least one correctness and completeness criterion. In the preferred embodiment, the correctness and completeness criterion corresponds to "declarative completeness". That is, any element referenced within the set must also be declared in the set in a manner that is compatible with all uses. For example, the type of the declaration must be suitable for all of the uses. However, it is to be appreciated that other correctness and completeness criteria may be used other than, or also including, "declarative completeness".

A brief description of terms will now be given to aid in defining step 406 of FIG. 4. Elements have names, specifications and, optionally, bodies. Specifications describe the element and how it should be used, by such means as types and semantic specifications. Bodies contain code implementing the element, such as function bodies. Elements without bodies are called "abstract;" elements with bodies are called "concrete." "Declared" means that the element must be present, but can be abstract. The body of an element can refer to other elements by name. The at least one correctness and completeness criterion is: whenever an element name is used (referenced) within some element in the extracted set, an element with that name must also be declared within that extracted set, and its specification must be consistent with all uses within the extracted set. In the preferred embodiment, the specification consists of element type, and "consistency" means type compatibility. However, in other embodiments, the specification can include items other than, or in addition to, element type. Given the teachings of the present invention provided herein, one of ordinary skill in the related art will contemplate these and various other embodiments of the specification.

With respect to step 408, if the analysis in step 406 reveals that the correctness and completeness criterion is not satisfied, then the set of extracted elements are automatically modified until the correctness and completeness criterion is satisfied.

In the preferred embodiment, this is done by adding abstract elements to the set for all referenced elements that fall outside the set. In this embodiment, an abstract element is created by copying the name and specification from the referenced element outside the set, but omitting the body, if any. This approach is guaranteed to result in declarative completeness. In other embodiments, more sophisticated approaches are possible, such as analyzing all uses and reducing the copied specifications to be just sufficient for those uses.

With respect to step 410 of FIG. 4, a single software module is created consisting of the set of extracted elements, as modified during step 408. This set satisfies the desired correctness and completeness criterion and is, therefore, a valid module.

In the preferred embodiment, this module is called a "hyperslice," which is simply defined as a set of elements that is declaratively complete. It can be thought of and represented as a JAVA package, containing just the elements in the extracted set. Some abstract elements (i.e., elements without bodies) can be represented using the "abstract" keyword in JAVA. Other abstract elements cannot be represented this way. Instead, they are represented by JAVA elements with null bodies or bodies that merely throw an exception. A JAVA package written this way is valid in JAVA, and is also a valid hyperslice.

With respect to the criterion recited in step 404 of FIG. 4, such criterion can be based on user input. Using a browser that shows the user all of the elements in the body of software, the user can point to and select those elements that are desired. Alternatively, the user can specify patterns that identify sets of elements, and perform set operations (such as union, intersection and set difference) on these sets.

For example, in the preferred embodiment, patterns such as operation display: Feature.Display
operation check: Feature.Check can be specified in a "concern mapping file." These particular patterns mean that every method named "display" belongs to a set (called a "concern") named Feature.Display, and every operation named "Check" belongs to a concern named Feature.Check. The set of extracted elements can then be specified as one of these, e.g., Feature.Display to extract all "display" methods, or as set combinations, e.g., Feature.Display union Feature.Check to extract all "display" and "check" methods.

Also concerning the criterion recited in step 404 of FIG. 4, sometimes it is useful to give general specifications followed by specific exceptions, when specifying the extraction criterion. For example, one can specify a large set of elements to extract, followed by some specific elements in that set that should not be extracted.

For example, in the preferred embodiment, the following sequence of patterns is permissible in the concern mapping file:

package ExpressionSEE: Feature.Kernel
operation display: Feature.Display

One can then specify the set of nodes to extract as

Feature.Kernel

What this means is the set of all elements in the package ExpressionSEE, except for methods named "display"; methods named "display", even if they are in package ExpressionSEE, are excluded from the extracted set, Feature.Kernel, because the second pattern assigns them to Feature.Display.

A description of a further specialization of the extraction criterion of step 404 of FIG. 4 will now be given. It is to be appreciated that sometimes it is convenient to classify the elements in a body of software according to a variety of concerns they pertain to. As discussed above, there are many different kinds, or dimensions, of concerns in most software. Class and Feature are examples of dimensions of concern. Every software element can pertain to multiple concerns, usually, but not always, of different kinds. For example, the method "PlusExpression.display( )" belongs to both the "PlusExpression" concern in the Class dimension and the "Display" concern in the Feature dimension.

In the preferred embodiment, this multi-dimensional concern structure is represented by a multi-dimensional space, referred to as a "hyperspace", in which each dimension (axis) represents a kind of concern, each coordinate on a dimension represents a concern of that kind, and each point in the space represents a software element. In the preferred embodiment, the purpose of the concern mapping file is to specify the structure of this matrix, that is, to identify the dimensions and their concerns, and to position each software element correctly within the space. A special dimension, called ClassFile, is implicitly present in every hyperspace that contains JAVA code; each concern in this dimension represents a single JAVA class file (the binary form of a JAVA class), and all elements in that class file pertain to that concern. Concern mapping files introduce additional dimensions. For example, the concern mapping file package ExpressionSEE: Feature.Kernel
operation display: Feature.Display introduces the Feature dimension with two concerns, Kernel and Display. It assigns all "display" methods to the Display concern, and all other elements in the ExpressionSEE package to the Kernel concern. Thus, the hyperspace has two dimensions, and the position of any software element in the hyperspace can be specified by a pair of coordinates, a class file and a feature. Thus, for example PlusExpression.display( ) is positioned at (PlusExpression, Display)
Literal.display( ) is positioned at (Literal, Display)
PlusExpression.getLeftOperand( ) is positioned at (PlusExpression, Kernel)

In the context of a hyperspace, it is convenient to express the set of nodes to be extracted in terms of the concerns in the hyperspace. Each concern is named as "Dimension.Concern", and refers to the set of all elements that pertain to that concern, i.e., for concern d.c, the set of all elements whose coordinate in the d dimension is c. For example, Feature.Display refers to all elements that pertain to the Display concern in the Feature dimension, which the concern mapping above specified to be all "display" methods. Since these concerns refer to sets, they can be used in isolation, or combined by means of set operations as noted earlier.

Figure 5:
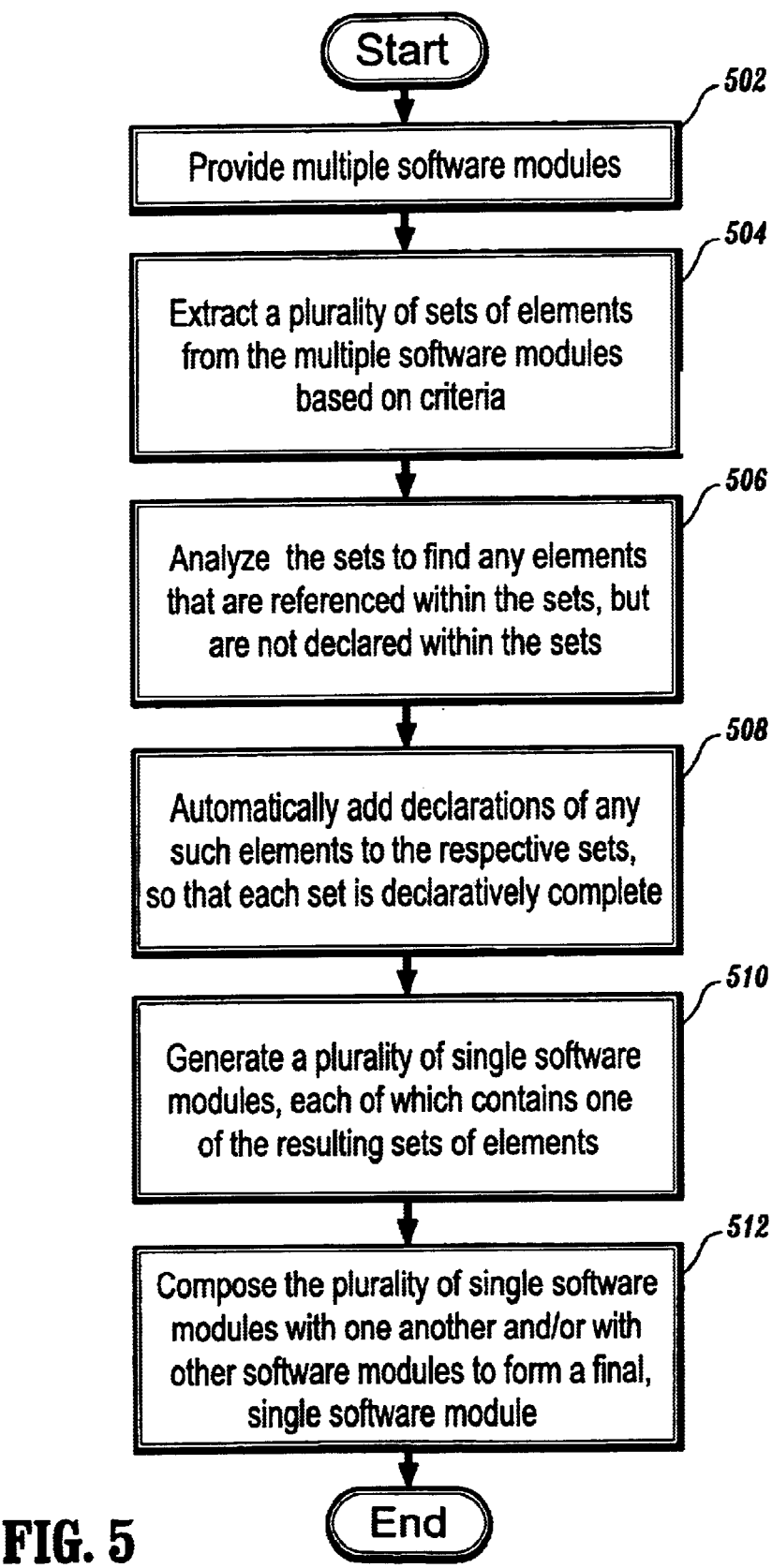
FIG. 5 is a flow diagram of a method for generating a software module based upon elements from multiple software modules according to still yet another illustrative embodiment of the present invention.

FIG. 5 is a flow diagram of a method 500 for generating a software module based upon elements from multiple software modules according to still yet another illustrative embodiment of the present invention. The method includes the step of providing multiple software modules (step 502). A plurality of sets of elements are extracted from the multiple software modules based upon at least one criterion (step 504). For each set, any elements that are referenced but not declared therein are identified (step 506). Declarations of the identified elements are automatically added to the respective sets, thereby ensuring that each of the sets are declaratively complete (step 508). A plurality of single software modules is generated, wherein each of the single software modules contains one of the resulting sets of elements (step 510). The plurality of single software modules are composed with one another and/or with other software modules to form a final, single software module (step 512). The final, single software module is a semantically correct entity.

It is to be appreciated that extracting software modules is primarily useful if the modules can be used in the construction of systems. Typically, a single extracted module is not a complete system; it must be "composed" with other modules to form a complete system. These other modules might also be extracted, or might be written directly by software engineers. In either case, they must satisfy the appropriate correctness and completeness criterion described above.

Composition (as per step 512) must combine the input modules into a final, single result module that also satisfies the correctness and completeness criterion. This generally involves the following two steps: (1) determination of correspondence between elements in different modules; and (2) creation of the result module, in which corresponding input elements are combined into single output elements.

With respect to the correspondence determination, consider the following example. Several input modules might contain classes called Employee, used to model employees in a company. The details of these classes might be different, representing different views of employees appropriate to the different modules. Nonetheless, since all these classes describe the same kinds of objects, Employees, they correspond. In this case, correspondence was deduced from the class names. This is common, but not required. Many other means of correspondence determination are possible, including explicit specification by the software engineer. Usually, when multiple modules extracted from the same body of software are composed, the abstract elements created during step 508 above are made to correspond to the concrete elements from which they were created. However, this is not essential. There are cases where the abstract elements are deliberately made to correspond to different concrete elements, resulting in a system with different behavior.

With respect to the creation of the result module, in which corresponding input elements are combined into single output elements, consider the following expansion of the preceding example. A single Employee class is created in the result module by combining the details of all the Employee classes in the input modules. The creation approach ensures that the desired correctness and completeness criterion is satisfied by the result module.

In the preferred embodiment of the present invention, the software engineer performing composition specifies a set of "integration relationships" used to guide composition. These include general, default relationships that specify a composition strategy, and specific relationships adding details or handling exceptions. Many kinds of integration relationships are possible.

A brief description will now be given of key relationships implemented in the preferred embodiment of the present invention, most of which are based upon subject-oriented programming composition rules. Examples of such rules are described by Harrison et al., in "Specifying Subject-Oriented Composition", Theory and Practice of Object Systems, 2(3):179–202, December 1996. "MergeByName" indicates that elements in different hyperslices that have the same name are to correspond, and are to be connected by a merge relationship, which causes connected elements to be integrated together into a new element. This is the most commonly used strategy.

NonCorrespondingMerge means that elements in different hyperslices with the same name are not to correspond and, hence, are not to be connected, by default, by any merge relationship. Non-corresponding merge is generally used in circumstances where elements in different hyperslices accidentally have the same name, but are not actually related to one another. "OverrideByName" indicates that elements with the same name are to correspond, and are to be connected by an override relationship, which causes the last one to override the others. This means that one of the elements that are connected by the override relationship (the last element named) will override (i.e., replace) the others in the composed software.

The "equate" relationship indicates that a set of elements are to match each other to correspond—even if their names are not the same. This relationship is used to set up correspondence only—the specific integration relationship connecting the corresponding elements depends on the general composition strategy.

The "order" relationship indicates that the order of corresponding elements is significant, and it describes any order constraints.

The "rename" relationship indicates that a specific element in the composed hyperslice is to be given a new name.

The "merge" relationship causes the named elements to be equated and merged, independent of the general composition strategy.

The "override" relationship indicates that one element overrides one or more other elements with which it corresponds, in the sense described for overrideByName earlier.

The "noMerge" relationship has the opposite effect to the merge (or override) relationship. The "noMerge" relationship causes two or more elements that match each other not to be merged (overridden), even if the general composition strategy is to merge (override) them.

The "match" relationship is used to indicate that a given element should match a set of elements, specified using pattern matching on element names. For example, the pattern "X*" matches all elements whose names begin with "X".

The "bracket" relationship indicates that a set of methods should be bracketed, i.e., their invocation should be preceded and/or followed, by other specified methods (sometimes called "before" and "after" methods).

The "summary function" relationship specifies a function to be called to reduce multiple return values, produced by multiple corresponding methods composed together, to a single return value.

A brief summary of some of the many advantages of the present invention will now be given. As is apparent to one of ordinary skill in the related art, the invention overcomes the tyranny of the dominant decomposition. The invention allows for "on-demand remodularization". That is, the invention allows a body of software that was written with one (or more) particular decompositions to be decomposed in different ways, without rewriting the software and, in some cases, without even recompiling the software. Modules making up these new decompositions can then be used for composing systems. This approach can be applied to any software development paradigms and languages.

When a developer is dealing with a particular concern, he or she can use the invention to obtain a module that includes all the software pertaining to that concern. The developer can then focus on that module, limiting the amount of material that must be understood in detail. Examples of such concerns are system "features" (major units of functionality within the system), or "variants" (different versions of the system for different target systems or users).

Sometimes system variants are desired that leave out certain features. If the system was built without feature removal in mind, removing them is usually extremely costly, often so much so that it is not done. The invention makes it possible, subject to certain restrictions, to encapsulate each feature in a module, and then use composition to create systems that include or exclude desired features.

A module extracted by the invention is a useful unit of reuse. Since the extracted module encapsulates a particular concern, the module has the potential to be used in other contexts and systems where that concern is pertinent. The flexible composition approach allows it to be tailored to the new contexts and systems.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for generating a software module based upon elements from multiple software modules, the method comprising the steps of:

extracting a plurality of sets of elements from the multiple software modules based upon at least one extraction criterion;

identifying any elements in the sets that violate at least one correctness and completeness criterion, and automatically bringing the violating elements into compliance with the at least one correctness and completeness criterion;

generating a plurality of single software modules, wherein each of the single software modules contains one of the sets of elements; and composing the plurality of single software modules with one another, with other software modules, or any combination thereof, to form a final, single software modules;

wherein said extracting step further comprises the steps of:

classifying the elements in the multiple software modules according to concerns the elements pertain to;

representing the concerns by a multi-dimensional space, wherein each dimension represents a type of concern, each coordinate on a dimension represents a concern of that type, and each point in the space represents an element; and representing the at least one extraction criterion in terms of the multi-dimensional space.

2. The method according to claim 1, wherein said step of bringing the violating elements into compliance comprises at least one of the steps of:

adding at least one element to at least one of the sets of elements;

modifying at least one of the violating elements; and modifying at least one of the non-violating elements.

3. The method according to claim 1, wherein the at least one extraction criterion is one of predefined and specified by a user.

4. The method according to claim 1, wherein the at least one correctness and completeness criterion is one of predefined and specified by a user.

5. The method according to claim 1, wherein the at least one correctness and completeness criterion corresponds to a declarative correctness and completeness criterion.

6. The method according to claim 5, wherein the declarative correctness and completeness criterion comprises a specification that a given element referenced within a given set must also be declared in the given set in a manner that is compatible with all uses of the given element in the given set.

7. The method according to claim 1, wherein the at least one extraction criterion identifies first elements that are to be extracted, and second elements that are not to be extracted in the event that such second elements are part of said first elements.

8. The method according to claim 1, wherein each of the software modules comprise software code or software design artifacts.

9. The method according to claim 1, wherein said composing step comprises the step of determining correspondence between the elements in the plurality of single software modules.

10. The method according to claim 9, wherein said composing step further comprises the step of combining corresponding elements into the final, single software module.

11. The method according to claim 1, wherein said composing step comprises the step of following a set of integration relationships that specify which of the elements in the single software modules correspond to one another, and how the corresponding elements should be combined.

12. A method for generating a software module based upon elements from multiple software modules, the method comprising the steps of:

providing the multiple software modules;

extracting a set of elements from the multiple software modules based upon at least one criterion;

analyzing the set to find any elements that are referenced within the set but are not declared within the set;

automatically adding declarations of the undeclared elements to the set, so that the set is declaratively complete; and generating a single software module that contains the set of elements;

wherein each of the software modules comprise software code or software design artifacts.

13. The method according to claim 12, wherein the at least one criterion is one of predefined and specified by a user.

14. The method according to claim 12, wherein the at least one criterion identifies first elements that are to be extracted, and second elements that are not to be extracted in the event that such second elements are part of said first elements.

15. The method according to claim 12, wherein said extracting step further comprises the steps of:

classifying the elements in the multiple software modules according to concerns the elements pertain to;

representing the concerns by a multi-dimensional space, wherein each dimension represents a type of concern, each coordinate on a dimension represents a concern of that type, and each point in the space represents an element; and representing the at least one criterion in terms of the multi-dimensional space.

16. A method for generating a software module based upon elements from multiple software modules, the method comprising the steps of:

extracting a plurality of sets of elements from the multiple software modules based upon at least one criterion;

for each of the sets, identifying any elements that are referenced, but not declared, therein;

automatically adding declarations of the identified elements to the respective sets, so that each of the sets are declaratively complete;

generating a plurality of single software modules, wherein each of the single software modules contains one of the resulting sets of elements; and composing the plurality of single software modules to form a final, single software module, wherein the final, single software module is a semantically correct entity;

wherein each of the software modules comprise software code or software design artifacts.

17. The method according to claim 16, wherein said composing step comprises the step of following a set of integration relationships that specify which of the elements in the single software modules correspond to one another, and how the corresponding elements should be combined.

18. The method according to claim 16, wherein said extracting step further comprises the steps of:

classifying the elements in the plurality of software modules according to concerns the elements pertain to;

representing the concerns by a multi-dimensional space, wherein each dimension represents a type of concern, each coordinate on a dimension represents a concern of that type, and each point in the space represents an element; and representing the at least one criterion in terms of the multi-dimensional space.

19. The method according to claim 16, wherein said composing step comprises the step of determining correspondence between the elements in the plurality of single software modules.

20. The method according to claim 19, wherein said composing step further comprises the step of combining corresponding elements into the final, single software module.

21. The method according to claim 19, wherein the correspondence is based on at least element names.

22. A method for generating a software module based upon elements from multiple software modules, the method comprising the steps of:

- extracting a plurality of sets of elements from the multiple software modules based upon at least one extraction criterion;
- identifying any elements in the sets that violate at least one correctness and completeness criterion, and automatically bringing the violating elements into compliance with the at least one correctness and completeness criterion;
- generating a plurality of single software modules, wherein each of the single software modules contains one of the sets of elements; and
- composing the plurality of single software modules with one another, with other software modules, or any combination thereof, to form a final, single software module;
- wherein said composing step comprises the step of following a set of integration relationships that specify which of the elements in the single software modules correspond to one another, and how the corresponding elements should be combined; and
- wherein the set of integration relationships comprise general, default relationships that specify a composition strategy, and specific relationships that add details and handle exceptions.

23. A method for generating a software module based upon elements from multiple software modules, the method comprising the steps of:

- extracting a plurality of sets of elements from the multiple software modules based upon at least one criterion;
- for each of the sets, identifying any elements that are referenced, but not declared, therein;
- automatically adding declarations of the identified elements to the respective sets, so that each of the sets are declaratively complete;
- generating a plurality of single software modules, wherein each of the single software modules contains one of the resulting sets of elements; and
- composing the plurality of single software modules to form a final, single software module, wherein the final, single software module is a semantically correct entity;
- wherein said composing step comprises the step of following a set of integration relationships that specify which of the elements in the single software modules correspond to one another, and how the corresponding elements should be combined;
- wherein the set of integration relationships comprise general, default relationships that specify a composition strategy, and specific relationships that add details and handle exceptions.

24. A method for generating a software module based upon elements from multiple software modules, the method comprising the steps of:

- extracting a set of elements from the multiple software modules based upon at least one extraction criterion;
- identifying any elements in the set that violate at least one correctness and completeness criterion, and automatically bringing the violating elements into compliance with the at least one correctness and completeness criterion; and
- generating a single software module that contains the set of elements;
- wherein each of the software modules comprise software code or software design artifacts; and
- wherein said extracting step further comprises the steps of:
    - classifying the elements in the multiple software modules according to concerns the elements pertain to;
    - representing the concerns by a multi-dimensional space, wherein each dimension represents a type of concern, each coordinate on a dimension represents a concern of that type, and each point in the space represents an element; and
    - representing the at least one extraction criterion in terms of the multi-dimensional space.

25. A program storage device readable by machine, tangibly embodying a program of instructions executable by the machine to perform steps for generating a software module based upon elements from multiple software modules, said method steps comprising:

- extracting a plurality of sets of elements from the multiple software modules based upon at least one extraction criterion;
- identifying any elements in the sets that violate at least one correctness and completeness criterion, and automatically bringing the violating elements into compliance with the at least one correctness and completeness criterion;
- generating a plurality of single software modules, wherein each of the single software modules contains one of the sets of elements; and
- composing the plurality of single software modules to form a final, single software module;
- wherein each of the software modules comprise software code or software design artifacts; and
- wherein said extracting step further comprises the steps of:
    - classifying the elements in the multiple software modules according to concerns the elements pertain to;
    - representing the concerns by a multi-dimensional space, wherein each dimension represents a type of concern, each coordinate on a dimension represents a concern of that type, and each point in the space represents an element; and
    - representing the at least one extraction criterion in terms of the multi-dimensional space.

* * * * *